US012680904B2

(12) United States Patent　(10) Patent No.:　US 12,680,904 B2
Gray et al.　(45) Date of Patent:　Jul. 14, 2026

(54) EXTERNAL PRESSURE TESTING FIXTURE FOR TUBING UNIONS

(71) Applicant: Halliburton Energy Services, Inc., Houston, TX (US)

(72) Inventors: Matthew S. Gray, Spring, TX (US); Paul James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 388 days.

(21) Appl. No.: 18/222,918

(22) Filed: Jul. 17, 2023

(65) Prior Publication Data

US 2025/0027832 A1　Jan. 23, 2025

(51) Int. Cl.
*G01M 3/28* (2006.01)
*E21B 47/06* (2012.01)
*E21B 47/117* (2012.01)
*F16J 15/3268* (2016.01)
*F16J 15/3284* (2016.01)

(52) U.S. Cl.
CPC ........... *G01M 3/2861* (2013.01); *E21B 47/06* (2013.01); *E21B 47/117* (2020.05); *G01M 3/2853* (2013.01); *F16J 15/3268* (2013.01); *F16J 15/3284* (2013.01); *F16L 2201/30* (2013.01)

(58) Field of Classification Search
CPC . E21B 47/117; G01M 3/2853; G01M 3/2861; F16L 2201/30
USPC ..................................... 73/46, 49.5; 277/320
See application file for complete search history.

(56) References Cited

U.S. PATENT DOCUMENTS

| | | | | |
|---|---|---|---|---|
| 2,241,526 A | * | 5/1941 | Rosenkranz .......... | G01M 3/022 138/90 |
| 2,817,230 A | * | 12/1957 | Mccully .............. | G01M 3/2861 374/143 |
| 3,371,521 A | * | 3/1968 | Hauk .................. | G01M 3/2861 285/414 |
| 3,871,209 A | * | 3/1975 | Hasha ................. | G01M 3/2861 73/49.1 |
| 3,921,437 A | * | 11/1975 | Hauk ...................... | G01M 3/02 73/40.5 R |
| 4,019,371 A | * | 4/1977 | Chaplin ................ | F16L 23/167 73/49.8 |
| 4,099,405 A | * | 7/1978 | Hauk .................. | G01M 3/2861 73/49.1 |
| 4,132,111 A | | 1/1979 | Hasha | |

(Continued)

OTHER PUBLICATIONS

International Search Report and Written Opinion for International Patent Application No. PCT/US2023/029390 dated Apr. 8, 2024. PDF file. 9 pages.

*Primary Examiner* — John Fitzgerald
(74) *Attorney, Agent, or Firm* — Scott Richardson; C. Tumey Law Group PLLC

(57)　ABSTRACT

A system may include a sealing sleeve disposable about a tubing union joining a lower tubing and an upper tubing, at least one lower seal disposable proximate a lower end of the tubing union between the sealing sleeve and the lower tubing, and at least one upper seal disposable proximate an upper end of the tubing union between the sealing sleeve and the upper tubing. The at least one upper seal, the at least one lower seal, and the sealing sleeve form a pressure test cavity about the tubing union. The system may also include a fluid path configured to provide fluid communication between the pressure test cavity and a pressure test port.

20 Claims, 5 Drawing Sheets

(56)             References Cited

U.S. PATENT DOCUMENTS

| | | | | |
|---|---|---|---|---|
| 4,136,552 A * | 1/1979 | Hasha | ................. | G01M 3/2861 |
| | | | | 73/46 |
| 4,194,389 A | 3/1980 | Laging | | |
| 4,458,521 A * | 7/1984 | Pillette | ................... | E21B 33/03 |
| | | | | 73/40.5 R |
| 4,926,680 A | 5/1990 | Hasha et al. | | |
| 5,209,105 A * | 5/1993 | Hasha | ................. | G01M 3/223 |
| | | | | 73/49.1 |
| 6,467,336 B1 * | 10/2002 | Gotowik | ............. | G01M 3/2853 |
| | | | | 73/866.5 |
| 6,601,437 B2 * | 8/2003 | Gotowik | .............. | G01M 3/022 |
| | | | | 73/40.5 R |
| 6,763,701 B1 | 7/2004 | Moretz | | |
| 7,523,644 B2 * | 4/2009 | Van Winkle | .......... | F16L 23/167 |
| | | | | 73/49.3 |
| 8,186,202 B2 * | 5/2012 | Lafleur | ................ | F16L 19/103 |
| | | | | 285/119 |
| 8,739,607 B2 * | 6/2014 | Slack | .................. | G01M 3/2869 |
| | | | | 73/49.1 |
| 12,000,755 B2 * | 6/2024 | Kishi | ....................... | F16J 15/10 |
| 2010/0011840 A1 * | 1/2010 | Carson | ................ | G01M 3/2884 |
| | | | | 73/49.8 |
| 2010/0289225 A1 | 11/2010 | Lafleur et al. | | |

* cited by examiner

EXTERNAL PRESSURE TESTING FIXTURE FOR TUBING UNIONS

BACKGROUND

In the process of completing an oil or gas well, a casing string is run downhole into a wellbore to protect the wellbore from failure (e.g., collapse, erosion) and provide a fluid path for hydrocarbons during production. To access the hydrocarbons for production, a perforating gun system may be deployed into the casing string to form perforations through the casing and wellbore wall such that hydrocarbons may flow into the casing string via the perforation. Downhole completion tools may be run-in-hole once the perforations are formed. Such downhole completion tools may include tubing (e.g., hydraulic control lines, pneumatic control lines, etc.), which may include various segments joined via tubing unions.

Unfortunately, tubing unions may sometimes fail to maintain a seal between adjacent tubing segments, which may hinder production operations. As such, some tubing unions are designed to include internal components to permit pressure testing of the tubing unions to verify that the tubing union is adequately sealed. However, other smaller or more economic tubing unions do not include these additional components such that they are unable to be pressure tested, which may increase the risk of tubing leaks during production operations.

BRIEF DESCRIPTION OF THE DRAWINGS

These drawings illustrate certain aspects of some of the embodiments of the present disclosure and should not be used to limit or define the method.

DETAILED DESCRIPTION

Disclosed herein are systems and methods for performing an external pressure test on a tubing union for joining adjacent downhole tubing segments (e.g., hydraulic control lines, pneumatic control lines, and tubing encased conductors). Example embodiments include an external pressure test system disposable about the tubing union and configured to seal against a first tubing segment (e.g., a lower tubing segment) and an adjacent second tubing segment (e.g., an upper tubing segment), which are joined via the tubing union. The external pressure test system is configured to form a pressure test cavity about the tubing union. The pressure test cavity may be pressurized to a target pressure and then monitored over time to determine if there is a leak in the tubing union and/or in the respective connections with the lower tubing segment and the upper tubing segment. Screening tubing union for leaks prior to being run-in-hole may improve production by reducing interruptions in production to replace leaking tubing segments. Further, the external test system is easily removable following pressure testing, allowing the tubing union to fit into and through smaller spaces than may be possible if the pressure test system were left in place.

Figure 1:
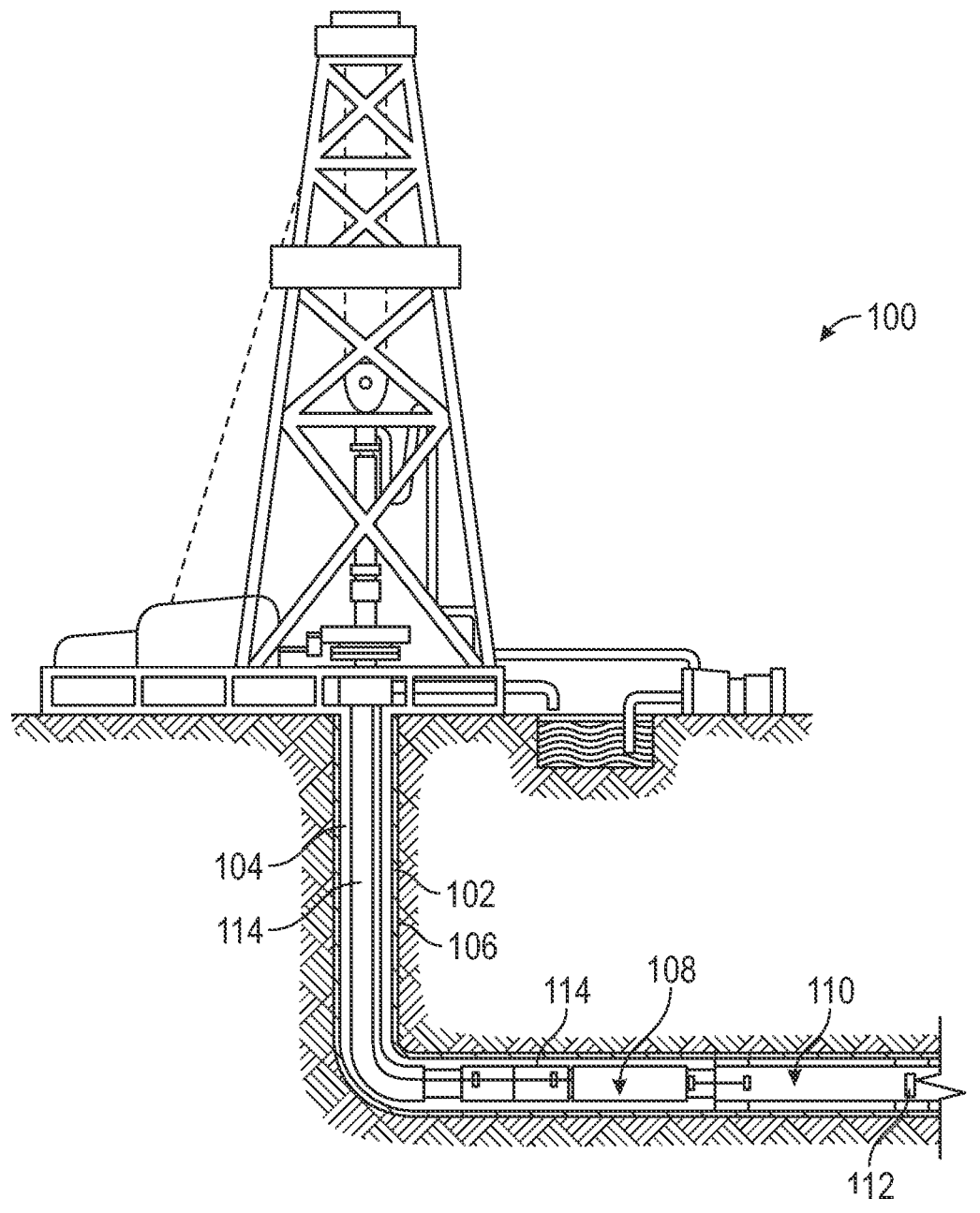
FIG. 1 illustrates an elevation view of a well system, in accordance with some embodiments of the present disclosure.

FIG. 1 illustrates an elevation view of a well system 100, in accordance with some embodiments of the present disclosure. As illustrated, casing 102 may be run into a wellbore 104 to protect the wellbore 104 from failure (e.g., collapse, erosion) and provide a fluid path for hydrocarbons during production. To access the hydrocarbons for production, a perforating gun system may be deployed into the casing 102 to form perforations in the casing 102 and wellbore wall 106 such that hydrocarbons may flow into the casing 102 via the perforation. Various downhole tools 108 may be run-in-hole once the perforations are formed. For example, a flow regulating system 110 may be disposed proximate the perforations. The flow regulating system 110 may control and limit debris, such as gravel, sand, and other particulate matter, from entering the casing 102 as the fluid passes through the flow regulating system 110 from the perforations. Further, the flow regulating system 110 or downhole tools 108 may include completion devices 112 (e.g., valves, sensors, gauges, actuators, etc.) that require fluid to operate. Various tubulars 114 (e.g., hydraulic control lines, pneumatic control lines, production tubing, etc.) may be used to convey fluid through the well system 100. The external pressure test system (shown in FIG. 2) may be configured to perform at least one external pressure test on joints (e.g., tubing unions) connecting adjacent tubulars to screen the joints for leaks prior to running the various tubulars in-hole. Additionally, the external pressure test system may be configured to perform external pressure tests on other tubing unions such as electrical splices and/or fiber splices for non-hydraulic control lines (e.g., electric cables, optical fibers, etc.). Indeed, the external pressure test system may be configured to perform external pressure tests on any suitable downhole connection.

Figure 2:
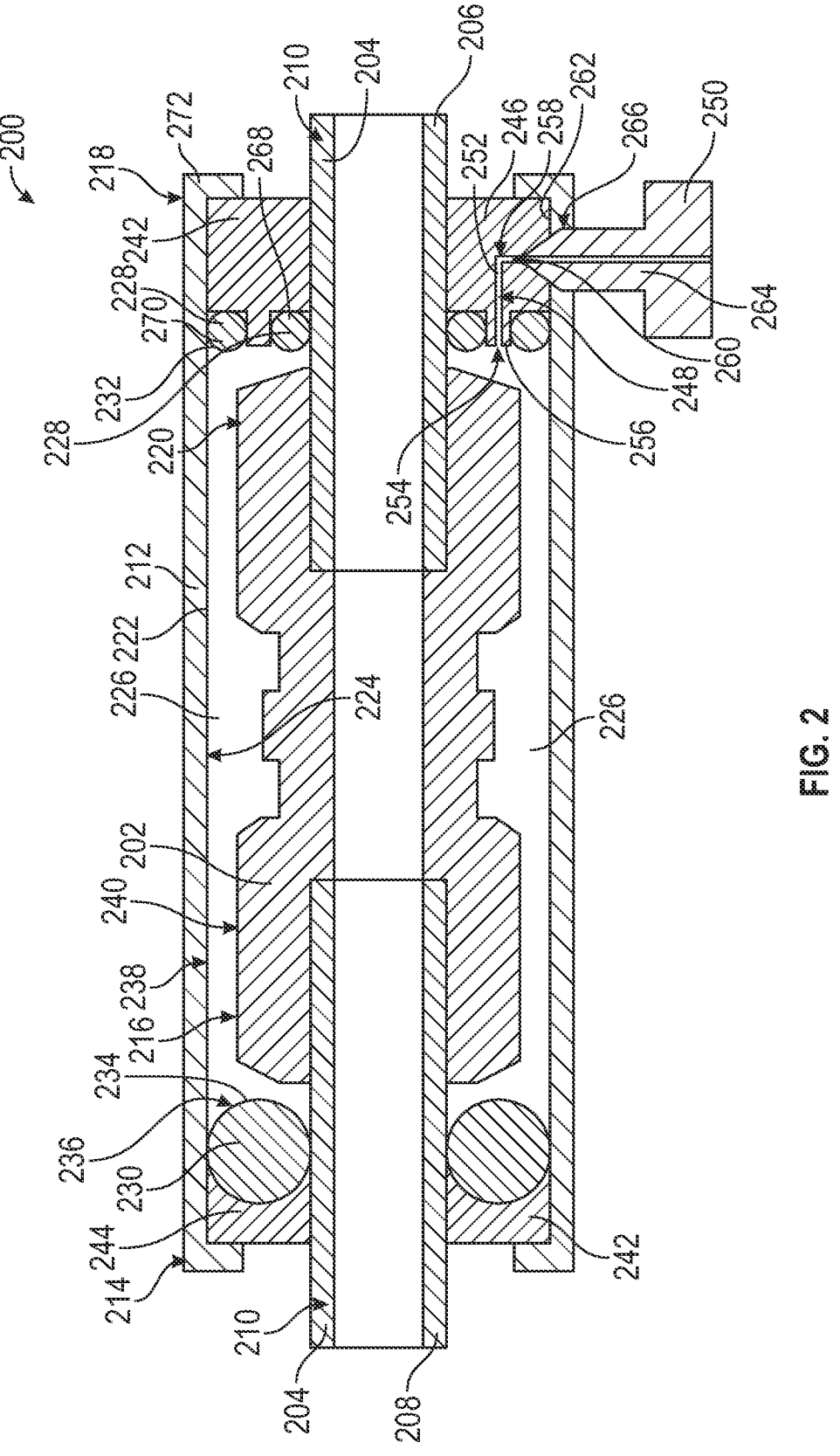
FIG. 2 illustrates a cross-sectional view of an external pressure test system disposed about a tubing union joining a lower tubing and an upper tubing, in accordance with some embodiments of the present disclosure.

FIG. 2 illustrates a cross-sectional view of an external pressure test system 200 disposed about a tubing union 202, in accordance with some embodiments of the present disclosure. As illustrated, the tubing union 202 is configured to join adjacent downhole tubing segments 204 (e.g., a lower tubing 206 and an upper tubing 208). For example, during completion operations multiple downhole tubing segments 204 may be joined together with tubing unions 202 to form a control line 210 that may be run-in-hole. However, as set forth above, each tubing union 202 may be pressure tested by the external pressure test system 200 before being run-in-hole.

The external pressure test system 200 may include a sealing sleeve 212 disposable about a tubing union 202 joining the adjacent tubing segments 204 (e.g., the lower tubing 206 and the upper tubing 208). The sealing sleeve 212 may have a hollow-cylindrical shape. As such, during installation, the sealing sleeve 212 may slide over the upper tubing 208 or the lower tubing 206 prior to joining the upper tubing 208 and the lower tubing 206 with the tubing union 202. Once the tubing union 202 is secured, the sealing sleeve 212 may slide to a position about the tubing union 202. With the sealing sleeve 212 positioned about the tubing union 202, the sealing sleeve 212 is configured to extend axially across the tubing union 202 from the lower tubing 206 to the upper tubing 208. That is, the sealing sleeve 212 may be axially longer than the tubing union 202 such that an upper portion 214 of the sealing sleeve 212 extends past an upper end 216 of the tubing union 202 to a position about the upper tubing 208, and such that a lower portion 218 of the sealing sleeve 212 extends past a lower end 220 of the tubing union 202 to a position about the lower tubing 206. Moreover, as set forth in greater detail below, an inner surface 222 of the sealing sleeve 212 may define a radially outer boundary 224 of a pressure test cavity 226 formed about the tubing union 202 by the external pressure test system 200.

The external pressure test system 200 may further include at least one lower seal 228 disposable proximate the lower end 220 of the tubing union 202. Specifically, the at least one lower seal 228 may be disposed about the lower tubing 206 in a position proximate the lower end 220 of the tubing union 202 such that the at least one lower seal 228 is positioned radially between the lower tubing 206 and the lower portion 218 of the sealing sleeve 212 that extends past the lower end 220 of the tubing union 202. Further, the at least one lower seal 228 may be configured to seal against both the lower tubing 206 and the sealing sleeve 212, respectively. Additionally, the pressure test system 200 may include at least one upper seal 230 disposable proximate an upper end 216 of the tubing union 202. Specifically, the upper seal 230 may be disposed about the upper tubing 208 in a position proximate the upper end 216 of the tubing union 202 such that the upper seal 230 is positioned radially between the upper tubing 208 and the upper portion 214 of the sealing sleeve 212 that extends past the upper end 216 of the tubing union 202. Further, the upper seal 230 may be configured to seal against both the upper tubing 208 and the sealing sleeve 212, respectively.

The at least one lower seal 228 and the at least one upper seal 230 may comprise any suitable type of seal or combination of seals for sealing against the sealing sleeve 212, as well as the lower tubing 206 and the upper tubing 208, respectively. For example, the at least one lower seal 228 and the at least one upper seal 230 may comprise O-rings. Alternatively, the at least one lower seal 228 and the at least one upper seal 230 may comprise cup seals. Further, the at least one lower seal and the at least one upper seal 230 may each comprise a flexible material having an elastic modulus between 0.5 Gigapascals (GPa) and 10 GPa, such that the at least one lower seal 228 and the at least one upper seal 230 may deflect to create seals that increase in strength in response to pressure being applied to the respective seals 228, 230.

Moreover, respective axially inner surfaces 232, 234 of the at least one lower seal 228 and the at least one upper seal 230 may define at least a portion of an axially outer boundary 236 of the pressure test cavity 226 formed about the tubing union 202 by the external pressure test system 200. Indeed, the upper seal 230, the at least one lower seal 228, and the sealing sleeve 212 may at least partially define the outer boundary 238 of the pressure test cavity 226 formed about the tubing union 202. The tubing union 202, the upper tubing 208, and the lower tubing 206 may also partially define the outer boundary 238 of the pressure test cavity 226. Specifically, the tubing union 202, the upper tubing 208, and the lower tubing 206 may define at least a portion of a radially inner boundary 240 of the pressure test cavity 226.

Further, the external pressure test system 200 may also include at least one seal support 242 that may also define at least a portion of the axially outer boundary 236 of the pressure test cavity 226. The at least one seal support 242 may be disposable proximate the upper seal 230, the at least one lower seal 228, or some combination thereof. As illustrated, the at least one seal support 242 may include an upper seal support 244 and a lower seal support 246. The upper seal support 244 may be disposed proximate the upper seal 230. Specifically, the upper seal support 244 may be positioned such that the upper seal 230 is disposed between the tubing union 202 and the upper seal support 244. Further, the lower seal support 246 may be disposed proximate the at least one lower seal 228. The lower seal support 246 may be positioned such that the at least one lower seal 228 is disposed between the tubing union 202 and the lower seal support 246.

The external pressure test system 200 may include a fluid path 248 configured to provide fluid communication between the pressure test cavity 226 and a pressure test port 250 that is interfaceable with a fluid source (not shown) configured to provide fluid for pressurizing the pressure test cavity 226 as part of the pressure test for the tubing union 202. Specifically, the fluid path 248 may extend through a seal support borehole 252 formed in the lower seal support 246. The seal support borehole 252 may include a first end 254 formed in an axially inner surface 256 of the lower seal support 246 such that the first end 254 is in fluid communication with the pressure test cavity 226. The seal support borehole 252 may include a bend 258 such that the second end 260 of the seal support borehole 252 may be formed in a radially outer surface 262 of the lower seal support 246. Further, the second end 260 of the seal support borehole 252 may be configured to receive a pressure test probe 264 and/or pressure test port 250. The lower seal support 246 at the second end 260 of the seal support borehole 252 may include a flexible material such that the second end 260 of the seal support borehole 252 may deflect in response to receiving the pressure test probe 264 and/or pressure test port 250 and seal against the pressure test probe 264 and/or pressure test port 250. Additionally, the sealing sleeve 212 may comprise a sleeve bore 266 that is aligned with the seal support borehole 252 such that the fluid path 248 may extend through the sealing sleeve 212.

Moreover, the at least one lower seal 228 may include an inner lower seal 268 and an outer lower seal 270. As illustrated, the inner lower seal 268 may be disposed between the lower tubing 206 and the lower seal support 246 proximate the second end 260 of the seal support borehole 252 such that the pressure test cavity 226 is sealed between the seal support borehole 252 and the lower tubing 206. Further, the outer lower seal 270 may be disposed between the sealing sleeve 212 and the lower seal support 246 proximate the second end 260 of the seal support borehole 252 such that the pressure test cavity 226 is sealed between the seal support borehole 252 and the sealing sleeve 212. As such, the external pressure test system 200 may seal the pressure test cavity 226 about the tubing union 202 and provide access to the pressure test cavity 226, via the fluid path 248 through the lower seal support 246, for the pressure test on the tubing union 202.

As set forth above, the pressure test may be performed by pressurizing the pressure test cavity 226 to a target pressure (e.g., 5-15 k psi). In particular, fluid may be pumped into the pressure test cavity 226 via the fluid path 248 to pressurize the pressure test cavity 226. After the pressure test cavity 226 is pressurized to the target pressure, the pressure in the pressure test cavity 226 is monitored over a pre-determined period of time to determine if there is a leak in the tubing union 202 and/or in the respective connections with the lower tubing 206 and the upper tubing 208. For example, if the pressure in the pressure test cavity 226 is maintained at the target pressure then the system may determine that the tubing union 202 does not have a leak. However, if the pressure in the pressure test cavity 226 drops over time then the system may determine that there is a leak in the tubing union 202.

During the pressure test, the pressure in the pressure test cavity 226 may exert a force on the sealing sleeve 212 to bend the sealing sleeve 212 radially outward. However, such bending of the sealing sleeve 212 may compromise the seals formed between the sealing sleeve 212 and the at least one lower seal 228 and the upper seal 230, respectively. Thus, to prevent substantial bending of the sealing sleeve 212, the sealing sleeve 212 may comprise a stiff material. That is, the sealing sleeve 212 may comprise a material having an elastic modulus between 1.0 Gigapascals (GPa) and 4000 GPa. Alternatively, the sealing sleeve 212 may comprise any material having an elastic modulus greater than 1.0 GPa. For example, the sealing sleeve 212 may comprise polyethere-therketone (PEEK) and wrapped carbon fiber (e.g., tubular structure with a smooth PEEK inner portion and with PEEK and continuous carbon fiber wrapped around the inner portion to provide stiffness and support), PEEK and glass fiber, molded glass filled PEEK, any suitable thermoplastic or resin with a reinforcing fiber, or some combination thereof. However, any suitable material having sufficient stiffness to withstand the forces exerted on the sealing sleeve 212 may be used.

Further, during the pressure test, the pressure in the pressure test cavity 226 may exert a force on the respective seals (e.g., the upper seal 230, the inner lower seal 268, and the outer lower seal 270) to drive the seals axially away from the tubing union 202. However, axial movement of the seals may compromise the pressure test cavity 226. As such, the at least one seal support 242 may be configured to restrain axially outward movement and/or expansion of the seals in response to pressure increasing within the pressure test cavity 226. Indeed, the at least one seal support 242 may comprise a stiff material having an elastic modulus between 10 Gigapascals (GPa) and 1000 GPa, such that the at least one seal support 242 may not deflect in response to axial forces exerted on the at least one seal support 242. Moreover, as illustrated, the sealing sleeve 212 may include at least one lip 272 configured to restrain axial movement of the at least one seal support 242 with respect to the tubing union 202.

Figure 3:
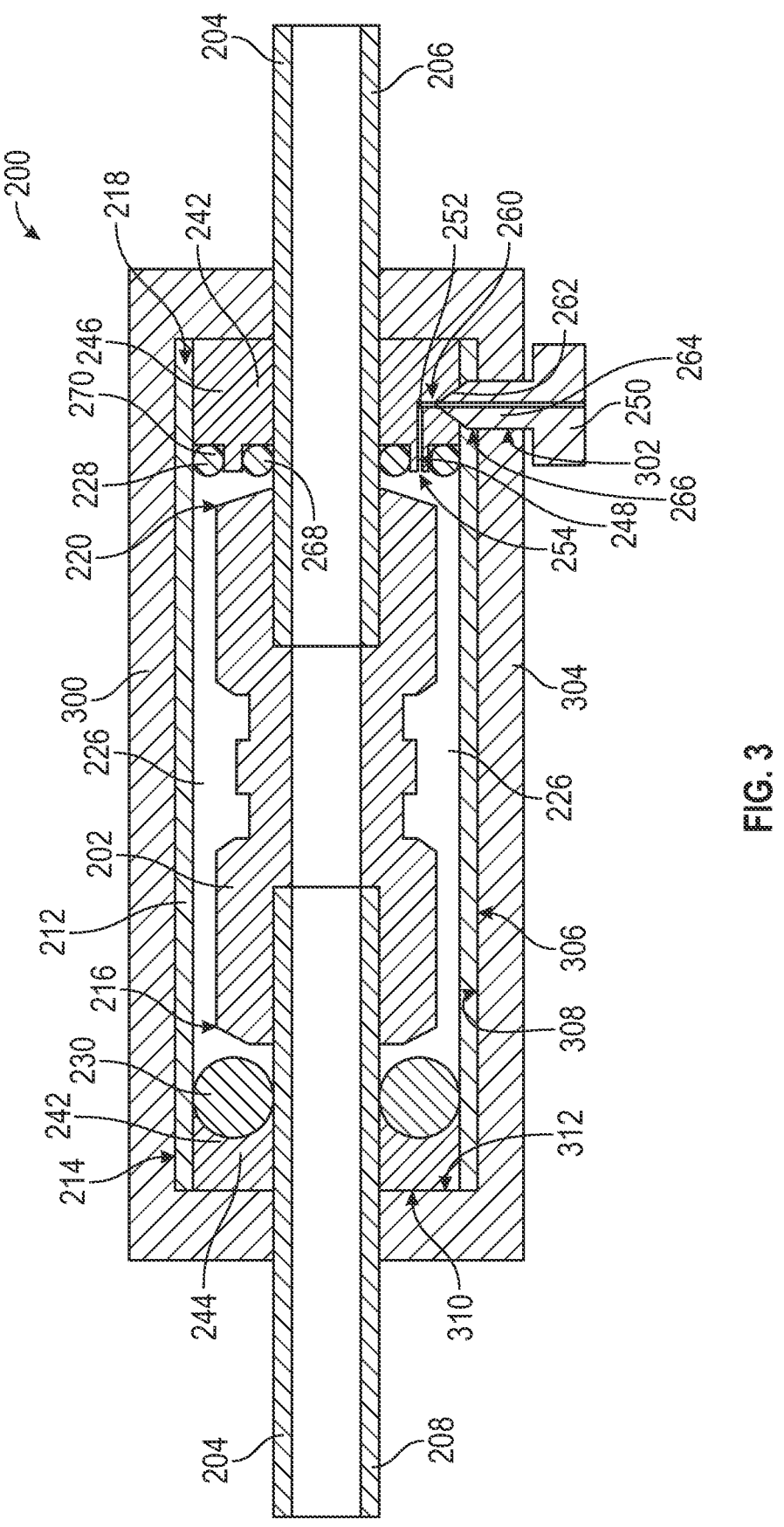
FIG. 3 illustrates a cross-sectional view of an external pressure test system having a support housing, in accordance with some embodiments of the present disclosure.

FIG. 3 illustrates a cross-sectional view of an external pressure test system 200 having a support housing 300, in accordance with some embodiments of the present disclosure. As set forth above, the external pressure test system 200 may include the sealing sleeve 212 that is disposable about a tubing union 202 joining adjacent tubing segments 204 (e.g., the lower tubing 206 and the upper tubing 208). With the sealing sleeve 212 positioned about the tubing union 202, the sealing sleeve 212 is configured to extend axially across the tubing union 202 from the lower tubing 206 to the upper tubing 208. That is, the sealing sleeve 212 may be axially longer than the tubing union 202 such that the upper portion 214 of the sealing sleeve 212 extends past the upper end 216 of the tubing union 202 to a position about the upper tubing 208, and such that the lower portion 218 of the sealing sleeve 212 extends past the lower end 220 of the tubing union 202 to a position about the lower tubing 206.

Further, as set forth above, the external pressure test system 200 may also include the at least one seal support 242. As illustrated, the at least one seal support 242 may include the upper seal support 244 and the lower seal support 246. The upper seal support 244 may be disposed proximate the upper seal 230. Specifically, the upper seal support 244 may be positioned such that the upper seal 230 is disposed between the tubing union 202 and the upper seal support 244. Further, the lower seal support 246 may be disposed proximate the at least one lower seal 228. The lower seal support 246 may be positioned such that at least one lower seal 228 is disposed between the tubing union 202 and the lower seal support 246.

Moreover, as set forth above, the at least one lower seal 228 may be disposable proximate the lower end 220 of the tubing union 202. Specifically, the at least one lower seal 228 may include the inner lower seal 268 and the outer lower seal 270. As illustrated, the inner lower seal 268 may be disposed between the lower tubing 206 and the lower seal support 246 proximate the second end 260 of the seal support borehole 252 such that the pressure test cavity 226 is sealed between the seal support borehole 252 and the lower tubing 206. Further, the outer lower seal 270 may be disposed between the sealing sleeve 212 and the lower seal support 246 proximate the first end 254 of the seal support borehole 252 such that the pressure test cavity 226 is sealed between the seal support borehole 252 and the sealing sleeve 212. Additionally, the at least one upper seal 230 may be disposable proximate the upper end 216 of the tubing union 202. Specifically, the upper seal 230 may be disposed about the upper tubing 208 in a position proximate the upper end 216 of the tubing union 202 such that the upper seal 230 is positioned radially between the upper tubing 208 and the upper portion 214 of the sealing sleeve 212.

Additionally, as set forth above, the fluid path 248 may extend through the seal support borehole 252 from the first end 254 to the second end 260 formed in the radially outer surface 262 of the lower seal support 246. Further, as set forth above, the second end 260 of the seal support borehole 252 may be configured to receive the pressure test probe 264 and/or pressure test port 250. Additionally, the sealing sleeve 212 may comprise a sleeve bore 266 that is aligned with the seal support borehole 252 (e.g., the second end 260 of the seal support borehole 252) such that the fluid path 248 may extend through the sealing sleeve 212. Further, the support housing 300 may include a housing borehole 302 extending radially through a sidewall 304 of the support housing 300. The housing borehole 302 may also be aligned with the seal support borehole 252 such that the fluid path 248 may extend through the support housing 300.

The support housing 300 of the external pressure test system 200 may be disposable about the sealing sleeve 212, the at least one upper seal 230, the at least one lower seal 228, and the at least one seal support 242. The support housing 300 may be configured to restrain deflection and/or movement of the other components (e.g., the sealing sleeve 212, the at least one upper seal 230, the at least one lower seal 228, and the at least one seal support 242) of the external pressure test system 200. As set forth above, the sealing sleeve 212 may comprise a stiff material. However, the sealing sleeve 212 may alternatively comprise a flexible material having an elastic modulus between 1 MPa and 1.0 GPa. The flexible material may deflect/bend in response to the pressure exerted on the sealing sleeve 212 during the pressure test, which may compromise the pressure test cavity 226. Thus, the support housing 300 may be configured to restrain deflection (e.g., outward expansion) of the sealing sleeve 212 during the pressure test. Specifically, a radially inner surface 306 of the support housing 300 is configured to interface with a radially outer surface 308 of the sealing sleeve 212 in a non-pressurized state of the pressure test cavity 226. The support housing 300 may comprise a stiff material such that the support housing 300 does not deflect in response to the pressure test cavity 226 being pressurized to the target pressure. As such, the interface between the radially outer surface 308 of the sealing sleeve 212 and the radially inner surface 306 of the support housing 300 may restrain deflection of the sealing sleeve 212.

Further, an axially inner surface 310 of the support housing 300 is configured to interface with an axially outer surface 312 of the at least one seal support 242 to restrain axial movement and/or deflection of the at least one seal support 242 in response to pressure increasing within the pressure test cavity 226. The at least one seal support 242 may be in contact with the at least one lower seal 228 and/or the at least one upper seal 230 such that the support housing 300 restraining axial movement and/or deflection of the at least one seal support 242 may additionally restrain axially movement of the at least one seal lower seal 228 and/or the at least one upper seal 230 to prevent the at least one seal lower seal 228 and/or the at least one upper seal 230 from sliding axially and compromising the pressure test cavity 226.

Figure 4:
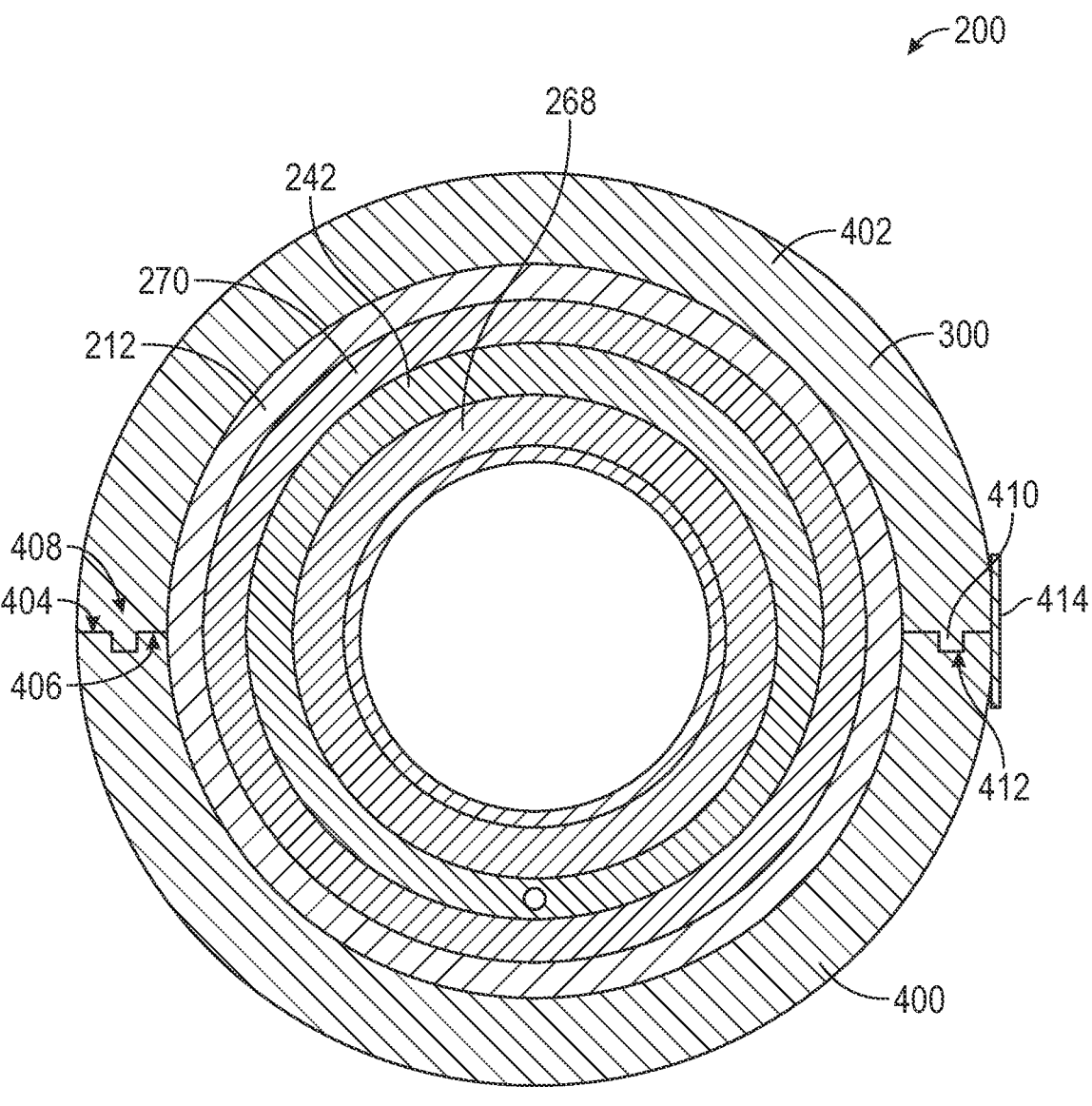
FIG. 4 illustrates a cross-sectional view of an external pressure test system, in accordance with some embodiments of the present disclosure.

FIG. 4 illustrates a cross-sectional view of an external pressure test system 200, in accordance with some embodiments of the present disclosure. As illustrated, the support housing 300 may comprise base portion 400 and a lid portion 402. The base portion 400 and the lid portion 402 may each have a half hollow cylindrical shape. A base interface surface 404 of the base portion 400 and a lid interface surface 406 of the lid portion 402 may be configured to secure against each other in a locked position to form a hollow cylindrical shape. In particular, the base portion 400 and the lid portion 402 may be configured to clamp about the tubing union 202 (shown in FIG. 3) and the other components (e.g., the sealing sleeve 212, the upper seal 230 (shown in FIG. 3), the inner lower seal 268, the outer lower seal 270, and the at least one seal support 242) of the external pressure test system 200 in the locked position. As illustrated, the base portion 400 and the lid portion 402 may each comprise respective alignment features 408 (e.g., an alignment protrusion 410 and an alignment recess 412) to help align the base portion 400 with the lid portion 402 prior to securing the base portion 400 to the lid portion 402. Alternatively, the base portion 400 and the lid portion 402 may comprise a hinged interface such that the aligned between the base portion 400 and the lid portion 402 may be fixed via the hinged interface.

Further, the external pressure test system 200 may include a locking mechanism 414 to hold the support housing 300 in a locked position. For example, the locking mechanism 414 may include a fastener, clamp (e.g., toggle clamp), pin, or any suitable feature for holding the support housing in the locked position. Further, the locking mechanism 414 may be configured to actuate between a locked position and an unlocked position. After completion of the pressure test, the support housing 300 may be removed from the tubing union 202 and re-used in subsequent pressure tests. As such, the locking mechanism 414 may be actuated to the unlocked position in response to completion of the pressure test such that the support housing 300 may be removed from the tubing union 202.

Figure 5:
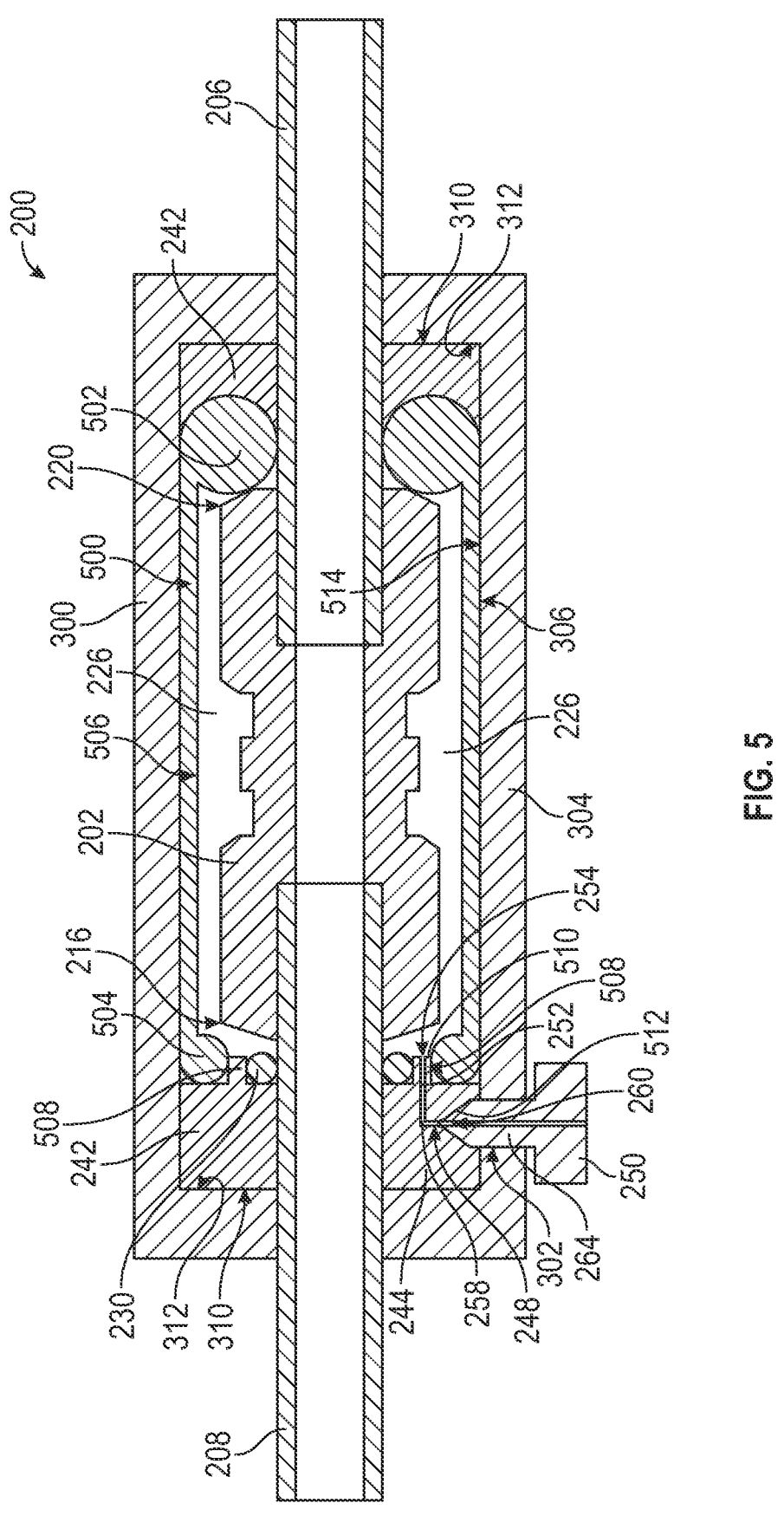
FIG. 5 illustrates a cross-sectional view of an external pressure test system having an extended seal, in accordance with some embodiments of the present disclosure.

FIG. 5 illustrates a cross-sectional view of an external pressure test system 200 having an extended seal, in accordance with some embodiments of the present disclosure. In particular, the external pressure test system 200 may have an extended lower seal 500 that is configured to extend axially across the tubing union 202 from the lower tubing 206 to the upper tubing 208. As illustrated, the extended lower seal 500 may have a first end 502 disposable about the lower tubing 206 proximate the lower end 220 of the tubing union 202. The first end 502 may be disposed about the lower tubing 206 in a position proximate the lower end 220 of the tubing union 202 such that the extended lower seal 500 is positioned radially between the lower tubing 206 and the support housing 300. Further, the first end 502 of the extended lower seal 500 may comprise a thickness that is equal to or slightly less than a radial distance between the lower tubing 206 and the support housing 300 such that the first end 502 may be compressed against the lower tubing 206 to form a seal between the first end 502 and the lower tubing 206.

Moreover, a second end 504 of the extended lower seal 500 may be disposable about the upper tubing 208 proximate the upper end 216 of the tubing union 202. A central portion 506 of the extended lower seal 500 may extend between the first end 502 and the second end 504 of the extended lower seal 500. The second end 504 may be disposed about the upper tubing 208 in a position proximate the upper end 216 of the tubing union 202 such that the upper seal 230 is positioned radially between the upper tubing 208 and the support housing 300. However, as illustrated, the second end 504 of the extended lower seal 500 may be positioned radially between the support housing 300 and a protruding portion 508 of the at least one seal support 242. The at least one seal support 242 may be disposable proximate the upper end 216 of the tubing union 202 between the support housing 300 and the upper tubing 208. Further, the protruding portion 508 may extend axially inward from the at least one seal support 242 in the direction toward the tubing union 202. Moreover, the second end 504 of the extended lower seal 500 may comprise a thickness that is equal to or slightly greater than a distance between the protruding portion 508 and the support housing 300 such that the second end 504 is compressed and forms seals against the protruding portion 508 and the support housing 300.

The external pressure test system 200 may further include the upper seal 230 disposable between the upper seal support 244 and the upper tubing 208 proximate the upper end 216 of the tubing union 202. In particular, the upper seal 230 may be compressed between the protruding portion 508 of the upper seal support 244 and the upper tubing 208 such that the upper seal 230 forms seals against the protruding portion 508 and the upper tubing 208. As such, pressure test cavity 226 may be formed between the upper seal 230, the upper seal support 244, the extended lower seal 500, the upper tubing 208, the tubing union 202, and the lower tubing 206.

As illustrated, the fluid path 248 may extend through a seal support borehole 252 formed in the upper seal support 244. The seal support borehole 252 may include the first end 254 formed in an axially inner surface 510 of the upper seal support 244 such that the first end 254 is in fluid communication with the pressure test cavity 226. The seal support borehole 252 may include the bend 258 such that the second end 260 of the seal support borehole 252 may be formed in a radially outer surface 512 of the upper seal support 244. Further, the second end 260 of the seal support borehole 252 may be configured to receive a pressure test probe 264 and/or pressure test port 250. The upper seal support 244 at the second end 260 of the seal support borehole 252 may include a flexible material such that the second end 260 of the seal support borehole 252 may deflect in response to receiving the pressure test probe 264 and/or pressure test port 250 and seal against the pressure test probe 264 and/or pressure test port 250. Additionally, the support housing 300 may include the housing borehole 302 extending radially through the sidewall 304 of the support housing 300. The housing borehole 302 may also be aligned with the seal support borehole 252 such that the fluid path 248 may extend through the support housing 300.

Moreover, the support housing 300 of the external pressure test system 200 may be disposable about tubing union 202 to restrain deflection and/or movement of the upper seal 230, the extended lower seal 500, and the upper seal support 244. Specifically, the radially inner surface 306 of the support housing 300 is configured to interface with at least a radially outer surface 514 of the central portion 506 of the extended lower seal 500 in a non-pressurized state of the pressure test cavity 226. The support housing 300 may comprise a stiff material such that the support housing 300 does not deflect in response to the pressure test cavity 226 being pressurized to the target pressure set forth above. As such, the interface between the radially outer surface 514 of the central portion 506 of the extended lower seal 500 and the radially inner surface 306 of the support housing 300 may restrain deflection of the extended lower seal 500.

Further, the axially inner surface 310 of the support housing 300 is configured to interface with the axially outer surface 312 of the at least one seal support 242 to restrain axial movement and/or deflection of the at least one seal support 242 in response to pressure increasing within the pressure test cavity 226. The at least one seal support 242 may be in contact with the extended lower seal 500 and/or the upper seal 230 such that the support housing 300 restraining axial movement and/or deflection of the at least one seal support 242 may additionally restrain axially movement of the extended lower seal 500 and/or the upper seal 230 to prevent the extended lower seal 500 and/or the upper seal 230 from sliding axially and compromising the pressure test cavity 226.

Accordingly, the present disclosure may provide an external pressure test system for performing pressure tests on tubing unions prior to running the tubulars joined via the tubing unions in-hole. The systems may include any of the various features disclosed herein, including one or more of the following statements.

Statement 1. A system, comprising: a sealing sleeve disposable about a tubing union joining a lower tubing and an upper tubing; at least one lower seal disposable proximate a lower end of the tubing union between the sealing sleeve and the lower tubing; at least one upper seal disposable proximate an upper end of the tubing union between the sealing sleeve and the upper tubing, and wherein at least one upper seal, the at least one lower seal, and the sealing sleeve form a pressure test cavity about the tubing union; and a fluid path configured to provide fluid communication between the pressure test cavity and a pressure test port.

Statement 2. The system of statement 1, wherein the sealing sleeve comprises a hollow-cylindrical shape.

Statement 3. The system of statement 1 or statement 2, wherein the sealing sleeve is configured to extend axially across the tubing union from the lower tubing to the upper tubing.

Statement 4. The system of any preceding statement, wherein the sealing sleeve comprises a stiff material having an elastic modulus between 1.0 Gigapascals (GPa) and 4000 GPa.

Statement 5. The system of any preceding statement, wherein the at least one lower seal and the at least one upper seal each comprise an O-ring, a cup seal, or some combination thereof.

Statement 6. The system of any preceding statement, wherein the at least one lower seal and the at least one upper seal each comprise a flexible material having an elastic modulus between 1.0 MegaPascal (MPa) and 1.0 GPa.

Statement 7. The system of any preceding statement, further comprising a support housing disposable about the sealing sleeve, wherein the support housing is configured to restrain outward expansion of the sealing sleeve in response to pressure increasing within the pressure test cavity.

Statement 8. The system of any preceding statement, wherein the support housing comprises base portion and a lid portion each having a half hollow cylindrical shape, and wherein the base portion and the lid portion are configured to clamp about the tubing union in a locked position.

Statement 9. The system of any preceding statement, further comprising a locking mechanism to hold the support housing in a locked position.

Statement 10. The system of any preceding statement, further comprising at least one seal support disposable proximate the upper seal, the lower seal, or some combination thereof, wherein the at least one seal support is configured to restrain axially outward expansion of the upper seal, the lower seal, or some combination thereof in response to pressure increasing within the pressure test cavity.

Statement 11. The system of any preceding statement, wherein the fluid path extends through the at least one seal support.

Statement 12. The system of any preceding statement, wherein the at least one seal support comprises a stiff material having an elastic modulus between 1.0 GPa and 4000 GPa.

Statement 13. The system of any preceding statement, wherein an axially inner surface of a support housing is configured to interface with an axially outer surface of the at least one seal support to restrain axial movement of the at least one seal support in response to pressure increasing within the pressure test cavity.

Statement 14. The system of any preceding statement, wherein the fluid path extends through the sealing sleeve.

Statement 15. A system, comprising: a sealing sleeve disposable about a tubing union joining a lower tubing and an upper tubing; a lower seal disposable proximate a lower end of the tubing union between the sealing sleeve and the lower tubing; an upper seal disposable proximate an upper end of the tubing union between the sealing sleeve and the upper tubing; and at least one seal support disposable proximate the upper seal, the lower seal, or some combination thereof, and wherein the at least one seal support, the upper seal, the lower seal, and the sealing sleeve form a pressure test cavity about the tubing union; a fluid path extending through the at least one seal support, wherein the fluid path is configured to provide fluid communication between the pressure test cavity and a pressure test port; and a support housing disposable about the sealing sleeve, wherein the support housing is configured to restrain outward expansion of the sealing sleeve in response to pressure increasing within the pressure test cavity.

Statement 16. The system of statement 15, wherein the support housing comprises base portion and a lid portion each having a half hollow cylindrical shape, and wherein the base portion and the lid portion are configured to clamp about the sealing sleeve in a locked position.

Statement 17. The system of statement 15 or statement 16, wherein a radially inner surface of the support housing is configured to interface with a radially outer surface of the sealing sleeve to restrain radially outward expansion of the sealing sleeve in response to pressure increasing within the pressure test cavity.

Statement 18. The system of any of statements 15-17, wherein the sealing sleeve comprises a flexible material having an elastic modulus between 1.0 MPa and 1.0 GPa.

Statement 19. A system, comprising: An extended lower seal having a first end disposable about a lower tubing proximate a lower end of a tubing union, wherein a second end of the extended lower seal is disposable about an upper tubing proximate an upper end of the tubing union, and wherein a central portion of the extended lower seal is disposable about the tubing union and extends between the first end and the second end of the lower seal; an upper seal support disposable proximate the upper end of the tubing union between the second end of the lower seal and the upper tubing; an upper seal disposable between the upper seal support and the upper tubing proximate the upper end of the tubing union, wherein the upper seal, the upper seal support, and the lower seal form a pressure test cavity about the tubing union; a fluid path extending through the upper seal support, wherein the fluid path is configured to provide fluid communication between the pressure test cavity and a pressure test port; and a support housing disposable about a tubing union joining a lower tubing and an upper tubing, wherein the support housing is configured to restrain outward expansion of the central portion of the extended lower seal in response to pressure increasing within the pressure test cavity.

Statement 20. The system of statement 19, wherein the support housing comprises a borehole extending radially through a sidewall of the support housing, wherein the borehole is aligned with the fluid path to place the borehole in fluid communication with the fluid path.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A system, comprising:
a sealing sleeve disposable about a tubing union joining a lower tubing and an upper tubing;
a lower seal support disposable between a lower portion of the sealing sleeve and the lower tubing:
an inner lower seal disposable axially between a lower end of the tubing union and the lower seal support and disposable radially between a protruding member of the lower seal support and the lower tubing;
an outer lower seal disposable axially between the lower end of the tubing union and the lower seal support and disposable radially between the protruding member of the lower seal support and
the sealing sleeve, wherein the lower seal support is configured to restrain axially outward expansion of the outer lower seal and the inner lower seal;
at least one upper seal disposable proximate an upper end of the tubing union between the sealing sleeve and the upper tubing, and wherein the at least one upper seal, the at least one lower seal, and the sealing sleeve form a pressure test cavity about the tubing union; and
a fluid path configured to provide fluid communication between the pressure test cavity and a pressure test port; and
a support housing disposable about the sealing sleeve, wherein the support housing is configured to restrain outward expansion of the sealing sleeve in response to pressure increasing within the pressure test cavity.

2. The system of claim 1, wherein the sealing sleeve comprises a hollow- cylindrical shape.

3. The system of claim 1, wherein the sealing sleeve is configured to extend axially across the tubing union from the lower tubing to the upper tubing.

4. The system of claim 1, wherein the sealing sleeve comprises a stiff material having an elastic modulus between 1.0 Gigapascals (GPa) and 4000 GPa.

5. The system of claim 1, wherein the at least oneinner lower seal, the outer lower seal, and the at least one upper seal each comprise an O-ring, a cup seal, or some combination thereof.

6. The system of claim 1, wherein the inner lower seal, the outer lower seal and the at least one upper seal each comprise a flexible material having an elastic modulus between 1.0 MegaPascal (MPa) and 1.0 GPa.

7. The system of claim 1, wherein the support housing comprises base portion and a lid portion each having a half hollow cylindrical shape, and wherein the base portion and the lid portion are configured to clamp about the tubing union in a locked position.

8. The system of claim 1, further comprising a locking mechanism to hold the support housing in a locked position.

9. The system of claim 1, further comprising an upper seal support disposable proximate the upper seal wherein the upper seal support is configured to restrain axially outward expansion of the upper seal in response to pressure increasing within the pressure test cavity.

10. The system of claim 1, wherein the fluid path extends through the sealing sleeve.

11. A system, comprising:
a sealing sleeve disposable about a tubing union joining a lower tubing and an upper tubing;

at least one lower seal disposable proximate a lower end of the tubing union between the sealing sleeve and the lower tubing;

at least one upper seal disposable proximate an upper end of the tubing union between the sealing sleeve and the upper tubing, and wherein at least one upper seal, the at least one lower seal, and the sealing sleeve form a pressure test cavity about the tubing union; and a fluid path configured to provide fluid communication between the pressure test cavity and a pressure test port; and a support housing disposable about the sealing sleeve, wherein the support housing is configured to restrain outward expansion of the sealing sleeve in response to pressure increasing within the pressure test cavity at least one seal support disposable proximate the upper seal, the lower seal, or some combination thereof, wherein the at least one seal support is configured to restrain axially outward expansion of the upper seal, the lower seal, or some combination thereof in response to pressure increasing within the pressure test cavity, and wherein the fluid path extends through the at least one seal support.

12. The system of claim 9, wherein the upper seal support, the lower seal support or some combination thereof comprises a stiff material having an elastic modulus between 1.0 GPa and 4000 GPa.

13. The system of claim 9, wherein an axially inner surface of a lower portion of the support housing is configured to interface with an axially outer surface of the lower seal support to restrain axial movement of the lower seal support in response to pressure increasing within the pressure test cavity, and wherein an axially inner surface of an upper portion of the support housing is configured to interface with an axially outer surface of the upper seal support to restrain axial movement of the upper seal support in response to pressure increasing within the pressure test cavity.

14. A system, comprising:

a sealing sleeve disposable about a tubing union joining a lower tubing and an upper tubing;

a lower seal disposable proximate a lower end of the tubing union between the sealing sleeve and the lower tubing;

an upper seal disposable proximate an upper end of the tubing union between the sealing sleeve and the upper tubing; and at least one seal support disposable proximate the upper seal, the lower seal, or some combination thereof, and wherein the at least one seal support, the upper seal, the lower seal, and the sealing sleeve form a pressure test cavity about the tubing union;

a fluid path extending through the at least one seal support, wherein the fluid path is configured to provide fluid communication between the pressure test cavity and a pressure test port; and a support housing disposable about the sealing sleeve, wherein the support housing is configured to restrain outward expansion of the sealing sleeve in response to pressure increasing within the pressure test cavity.

15. The system of claim 14, wherein the support housing comprises base portion and a lid portion each having a half hollow cylindrical shape, and wherein the base portion and the lid portion are configured to clamp about the sealing sleeve in a locked position.

16. The system of claim 14, wherein a radially inner surface of the support housing is configured to interface with a radially outer surface of the sealing sleeve to restrain radially outward expansion of the sealing sleeve in response to pressure increasing within the pressure test cavity.

17. The system of claim 14, wherein the sealing sleeve comprises a flexible material having an elastic modulus between 1.0 MPa and 1.0 GPa.

18. The system of claim 14, further comprising a locking mechanism to hold the support housing in a locked position.

19. The system of claim 14, wherein the sealing sleeve comprises a hollow-cylindrical shape.

20. The system of claim 14, wherein the sealing sleeve is configured to extend axially across the tubing union from the lower tubing to the upper tubing.

* * * * *